Oct. 21, 1941.    B. F. McNAMEE ET AL    2,259,904
METHOD AND APPARATUS FOR LOGGING BORE HOLES
Filed Jan. 17, 1938    2 Sheets-Sheet 1

Bernard F. McNamee INVENTORS
Frank Rieber
BY
John F. Flam
ATTORNEY

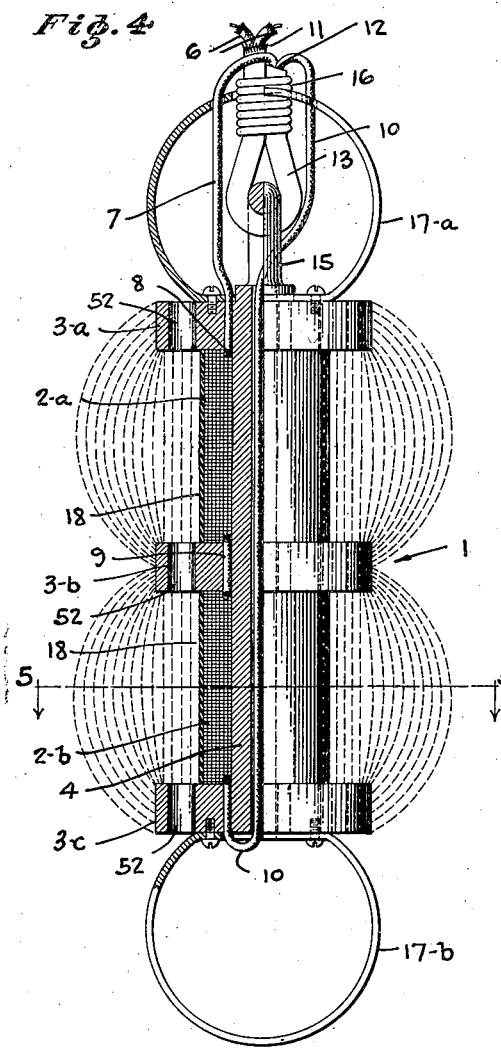
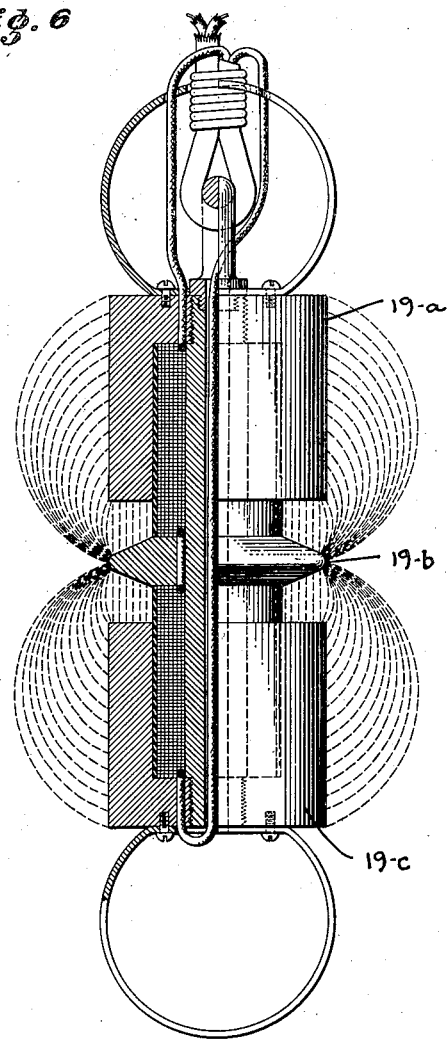
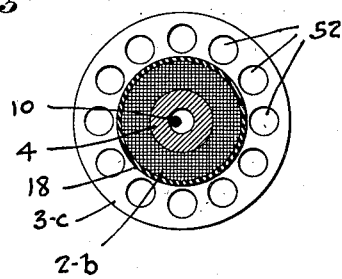

Patented Oct. 21, 1941

2,259,904

UNITED STATES PATENT OFFICE 2,259,904

METHOD AND APPARATUS FOR LOGGING BORE HOLES

Bernard F. McNamee and Frank Rieber, Los Angeles, Calif.

Application January 17, 1938, Serial No. 185,266

18 Claims. (Cl. 175—182)

This invention relates to that class of operations in which sensitive elements are lowered into bore holes in the earth, for the purpose of determining the physical characteristics of the various strata penetrated by the bore hole.

The invention has specifically for its object the measurement of the magnetic retentivity of the various strata and formations penetrated by the bore hole.

An object of the invention is to provide a method by which such measurements of retentivity may be rapidly and accurately carried on.

A further object of the invention is to provide apparatus for making such retentivity measurements, which shall be simple, inexpensive, rugged, and yet accurate and reproducible in its performance.

A further object of the invention is to provide apparatus by which measurements of the class described may be readily made, without the necessity for extreme skill or training on the part of the operator.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

The invention has particular value in correlating data relating to successive strata penetrated by adjacent bore holes made in exploring for petroleum or gas, or other minerals. Such bore holes commonly penetrate a sequence of sedimentary strata, occurring as alternating sands and shales of various composition and thickness. These strata, in turn, contain widely varying amounts of minerals having high magnetic retentivity, such for example as magnetite.

We have found by experiment that this retentivity may be readily measured by first subjecting a local portion of the rock in question to an intense magnetic field, and thereafter traversing the magnetized portion of the rock with an exploring system, adapted to cause an indication when passing through the localized magnetic field impressed on and remaining in the rock as a result of its magnetic retentivity.

We have found that the magnetism remaining in native minerals after being once exposed to a magnetic field, does not reach a final value immediately but falls off gradually, reaching a minimum value only after several hours or several days. For this reason it is desirable to make a number of well logs in the same bore hole. By comparing the values of residual magnetism obtained sequentially at various time intervals, a measure of the rate of the attenuation of magnetization may be obtained. This attenuation will also be characteristic of the strata and hence will be a correlatable property.

In the step of lowering a magnetizer into a bore hole and magnetizing the material in the walls of the bore hole the physical quality, retentivity, has been made measureable. In the sense that this previously unmeasurable quality has been made measurable, this step in the process may be described as a development of this physical quality. Ordinarily it will not be possible to measure the retentivity of the minerals forming the walls of the bore holes without previously treating these minerals by such a magnetizer as that described. Prior to this invention the physical state of strata have ordinarily been determined as they have been found in situ by observations on cores brought to the surface. One new feature of the invention is that the characteristics of strata are developed by treating the strata in situ and subsequently measuring the developed character. In contrast to the natural development that would occur due to natural causes not introduced by man, the aforementioned development may be said to be artificial. In the sense in which we are using the word "developed" in the application of the method as described, it may be said that the retentivity of strata has been developed by exposure to magnetic fields. It could also be said that the magnetic property of the strata has been developed by treating the strata with magnetic fields.

While we have chosen as an illustration of our invention a form of apparatus which may be lowered into a bore hole for taking measurements at varying levels, we do not wish to limit ourselves to this application only. It is evident that the method of our invention may be equally well adapted to making measurements of the magnetic retentivity of minerals exposed at out-crops on the surface, or to making similar determinations for core samples taken in bore holes and brought to the surface for testing.

Referring to the drawings:

Fig. 4 is a view, partly in section, of a magnetic element;

Fig. 5 is a cross section taken along plane 5—5 of Fig. 4; and

Fig. 6 is a view, partly in section, of another form of magnetic element.

Figure 1:
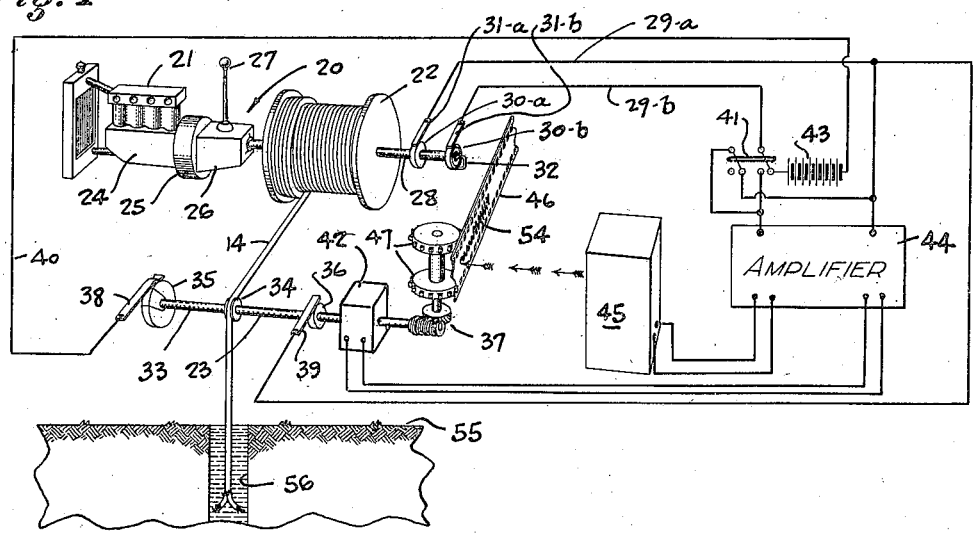
Figure 1 is a schematic illustration of the surface equipment which is used for the process.

In broad terms, the method of our invention, as exemplified by Figs. 1 to 5 inclusive, consists of traversing a section of bore hole with a magnetizer and at an approximately constant speed, simultaneously varying the current through the magnetizer, preferably in a periodic manner, and subsequently traversing the same section of bore hole with a pick-up device capable of measuring the intensity of the residual magnetism induced in the mineral forming the walls of the bore hole, simultaneously recording the intensity of said residual magnetism. Since the intensity of residual magnetism will generally depend not only on the strength of field of the magnetizer, but also on the time elapsed from the instant of magnetization to the instant of measurement, it may be desirable to make a number of surveys in the bore hole once it has been magnetized.

Magnetizer 1, or magnetizing element, is preferably made of a plurality of solenoids and magnetic washers alternately arranged on a hollow round cylinder 4 (Fig. 4) of magnetic material. As illustrated, the magnetic element 1 consists of two solenoids 2a—2b and three magnetic washers 3a—3b—3c. The core 4 and washers 3a—3b—3c should preferably be made of ferro-magnetic material of high permeability and low retentivity; permalloy is such a material. These solenoids 2a—2b are connected through the leads 6—6 in such a way that the polarity of the washers alternates from top to bottom of the magnetizer. This is accomplished in the present case by causing current to flow downward through the lead 7 into the solenoid 2a at the point 8, through the solenoid 2a to the connection 9, and through the coil 2b to the lead 10. Lead 10 returns to the cable through the center of the hollow core. The two solenoids 2a—2b are wound in opposite directions on the core 4. With coil 2a wound clockwise and coil 2b wound counterclockwise as viewed from the bottom, and connected in series as shown, and with the current flowing as indicated above, the center magnetic washer 3b is a north magnetic pole, and each of the other washers 3a and 3c are south magnetic poles. Coils arranged in this manner are commonly termed "differentially connected." The magnetic field of force is concentric about the axis of the core 4. The leads 7 and 10 enter the cable sheath 11 at the point 12. The cable is attached to the magnetizer by means of an eye-bolt 15 fixed in the core 4 and an eye 13 on the end of the cable 14, said eye being secured by serving 16. Secured to the top and bottom of the core 4 are centering springs 17a—17b. In the magnetic washers 3a—3b—3c are vertical holes 52 to facilitate the passage of the magnetizer up or down the bore hole, even in the presence of highly viscous mud.

To protect the solenoids 2a—2b against excessive wear and exposure, said solenoids are enclosed by covers 18—18, said covering being made of non-magnetic material, in order not to shunt the magnetic field. There are holes in the upper centering spring 17a through which holes pass the cable 14 and the leads 7 and 10.

In Figure 6 is illustrated an alternative form of magnetizer, in which the center magnetic washer 19b is small and tapered toward the periphery, and the upper and lower magnetic washers 19a—19c have large surfaces, thus permitting a concentration of magnetic flux at the center washer 19b and producing low flux densities elsewhere.

Also required to carry out bore hole exploration according to our invention, is a pick-up device capable of measuring strength of magnetic field, or pole strength. Preferably the magnetic element 1 may be used for this purpose. When the magnetic element is used to magnetize the material in the walls of the bore hole, it will be called a magnetizer; when it is used to measure the residual magnetism in the material of the walls, it will be called a pick-up. Evidently the simplest way to use the magnetic element as a pick-up is to draw it through the field to be measured. Evidently if the field is alternating in space N—S—N—S—N—S, etc. along the path along which the pick-up is being drawn, electromotive forces will be induced in the solenoids 2a—2b. For a given field strength of this space-alternating field, the sun of the induced electromotive forces will be a maximum when the distance between adjacent poles in the walls of the bore hole is the same as the distance between the magnetic washers 3a—3b—3c on the pick-up.

The surface equipment required to carry out exploration in accordance with the spirit of our invention, is shown schematically in Fig. 1, and consists essentially of means for causing the magnetizer to traverse the bore hole, and means for synchronously varying the magnetizing current periodically; means for causing the pick-up to traverse the bore hole, means for measuring the electro-motive force induced in the pick-up, and means for synchronously recording said induced electro-motive force.

In the form of the invention illustrated, the means for causing the magnetizer to traverse the bore hole and means for causing the pick-up to traverse the bore hole, are the same hoisting mechanism. Said hoisting mechanism 20, as illustrated, consists of a source of power 21, hoisting drum 22, cable 14, and cable guide 23. Said cable guide causes the cable, to which is attached the magnetic element, to be suspended vertically over the top of the bore hole 56 in the surface 55 of the earth.

As illustrated, the power supply 21 may include a gas engine 24, on the driving shaft of which is mounted a flywheel contained in a housing 25, a speed reducing device, such as a standard automotive transmission 26, and means for selecting the speed reduction ratio, here illustrated by the gear shift 27. In addition, the gas engine possesses the speed control devices normally present on gas engines, such as a throttle control.

The cable is reeled on the drum 22, said drum being secured to the driven shaft 28. The two wires of the cable are connected to external leads 29a—29b through the slip rings 30a—30b, and the brushes 31a—31b. Slip ring 30a is in metallic contact with the shaft 28, which in turn is electrically connected to one cable wire. Slip ring 30b consists of a metal rim mounted on a non-metallic, insulating, spacer, said metal rim benig electrically connected to the other cable wire by a wire 32 which, in the example illustrated, is led to the cable wire through the shaft 28, which is hollow from the slip ring end of the shaft to a convenient point in the drum, at which point a hole in the shaft permits connection of the wire 32 with the end of the cable wire.

The cable guide 23 includes a shaft 33 on which is mounted a pulley 34, contactor 35, slip ring 36, and gear train 37. The size of pulley 34 is so selected that the shaft 33 makes one rotation while the cable moves through a length approximately equal to twice the distance between successive magnetic washers 3a—3b—3c. Contactor 35 consists of a segmented non-metallic insulated disc, mounted on a metallic segment, said metallic segment maintaining contact with shaft 33, and being capable of making contact with the brush 34 during only a fraction of a revolution of the shaft 33.

A particular means used to vary the magnetizing current periodically is illustrated in Fig. 1. In the method illustrated current flows intermittently from the battery 43 through the lead 29b, the slip ring 30b, one lead of the cable 14, through solenoids 2a and 2b, returning through the other cable lead back to the slip ring 30a and the lead 29a through the brush 39, the slip ring 36, the metallic shaft 33, the contactor 35, the brush 38, and the lead 40, thereby completing this circuit to the battery 43.

Magnetizing currents flow only during the time interval during which the contactor 35 is in metallic contact with the brush 38; current does not flow while the non-metallic section of contactor 35 is in contact with the brush 38.

A double-pole switch 41 operates to connect either the battery 43 or the amplifier 44 in operable condition. As illustrated, the switch permits the magnetizing current to vary intermittently. In the alternate position of the switch, amplifier 44 is connected in such a manner that a measure of the electro-motive force across the cable leads may be amplified. On the output of the amplifier is connected a galvanometer 45 which projects a beam of light onto the film 46, the displacement of said beam of light being a measure of the electro-motive force impressed on the input of the amplifier.

On the driven end of gear train 37 is mounted a film sprocket 47 which engages the film 46.

Figure 2:
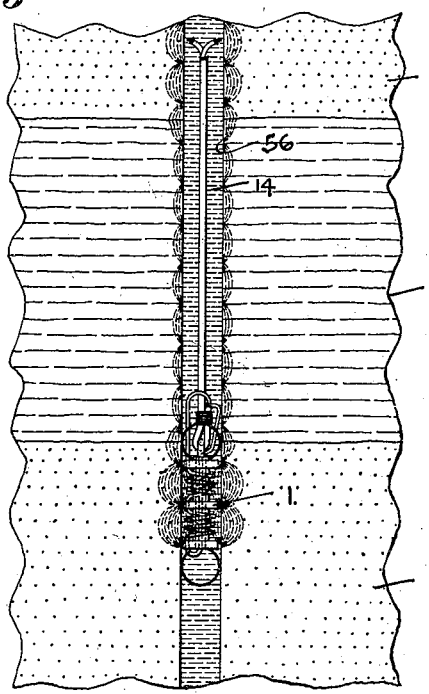
Fig. 2 is a sectional view in a vertical plane showing a magnetizer being lowered into a bore hole.

With the foregoing description of apparatus in mind, the method encompassed within our invention will be clear from the following discussion. In Fig. 2 is shown a magnetizer 1 at the end of the cable 14 in the process of being lowered into a bore hole. As the magnetizer is lowered into the bore hole, the magnetizing current flows intermittently. When the current flows the magnetizer becomes magnetized and magnetic poles are induced in the wall material adjacent to the magnetic washers. The magnetizing current exists for only a short time interval, falling to zero when the contactor 35 breaks metallic contact with the brush 38. As the magnetizer descends, the circuit remains open most of the time, making contact each time the magnetizer moves through a distance approximately equal to twice the distance between alternate magnetic washers. As illustrated, the circuit has just been broken and magnetism just induced in the walls of the bore hole. Some magnetism will remain in the walls when the current falls to zero. When the shaft 33 will have gone through almost a complete revolution, the top magnetic washer 3a will then be in the position now occupied by the bottom magnetic washer 3c. At the same time the circuit will be closed by the contactor 35 and the brush 38. A magnetic field will again be built up around the magnetizer. Since the polarity of the washers alternates along the length of the magnetizer, the field induced by the washer 3a, in the part of the wall which will then be adjacent to the magnetic washer 3a, will be of the same polarity as that previously induced by the magnetic washer 3c when it was opposite the same part of the wall material. When the magnetizer has passed a point, the magnetism induced in the wall material will not fall to zero, but will tend to remain due to the remanent property of the ferromagnetic minerals present in the walls of the bore hole. The intensity of the residual magnetism will depend in part on the concentration of ferromagnetic material in the stratum, as well as on the nature of the particular ferromagnetic substances present. Hence, as the magnetizer proceeds down the bore hole, north and south poles will alternate in position along the length of the bore hole traversed.

During the magnetizing process, the switch 41 is in the position shown and there is no film 46 in place in the recorder. After reaching the greatest depth for which the test run is desired, the switch 41 is set in the alternate position, thereby disconnecting the battery 43 and connecting the amplifier 44. With the recorder loaded with film, the cable is then withdrawn from the bore hole and at approximately constant cable speed.

Figure 3:
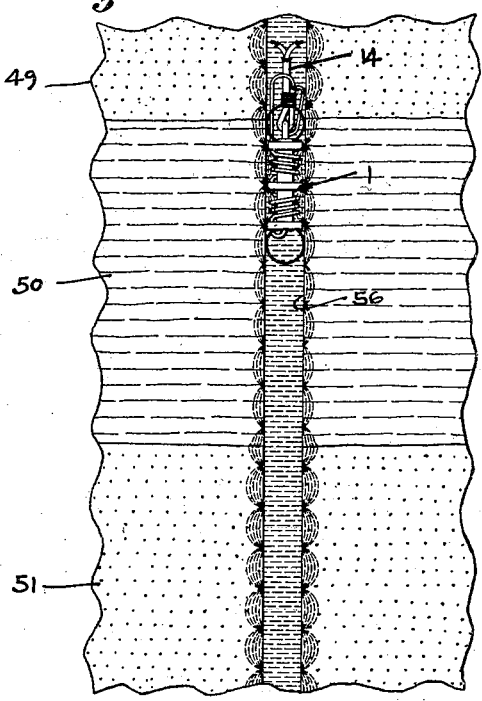
Fig. 3 is a sectional view in a vertical plane showing a pickup being withdrawn from a bore hole.

As the pick-up 1 ascends, as in Fig. 3, an alternating electro-motive force is induced in the solenoids and recorded on the synchronously driven film, which is caused to move past the oscillograph 45 by the cable being drawn over the pulley 34, and thereby driving the film sprocket 47 through the gear train 37, the teeth of said film sprocket engaging and drawing said film past the oscillograph at a rate proportional to the speed of the cable. In this way, distances along the length of the film are proportional to the length of the bore hole explored. Knowing the ratio of cable speed to film speed, the depth corresponding to any point on the film may be calculated readily.

As illustrated in Fig. 1, there is indicated a portion of the latent image 54 made on the film 46. Here there is indicated a wave of large amplitude corresponding to the electro-motive force generated while the pick-up was moving upward in the bore hole in stratum 51 where the remanence was comparatively high; and a wave of small amplitude corresponding to the electro-motive force generated while the pick-up has been moving upward in the bore hole in stratum 50, where the remanence is comparatively low. When the pick-up ascends to a higher point, it will reach the stratum 49 where the remanence is high and a high residual magnetism remains, the amplitude of the oscillograph trace will again be large. By traversing the entire length of bore hole to be explored in this manner, a well-log is obtained in which the retentivity as a function of depth is indicated.

In order to further facilitate making uniform and reproducible records, we prefer to have the magnetic element 1 traverse the bore hole at a constant speed. This may be done manually by an operator who controls the engine speed in accordance with the reading of a tachometer mounted on the shaft 23. In order to smooth out the speed of the cable, advantage is taken of the inertia of the cable, and the flywheel effect of the loaded drum 22 and the flywheel in the housing 25. Vertical oscillation in the position of the magnetic element is mostly overcome by the viscous effect of the mud in the bore hole, partly by the steady force on the cable and partly by the inertia of the system. While it is not absolutely required that this oscillation be absent in the apparatus described, it is preferably reduced to a small amount. Obviously by appropriate design, such oscillation may be reduced to a value below a minimum disturbing amount. On the other hand, in another form of apparatus the pick-up may be oscillated about a specific mean position in the bore hole and a reading of the galvanometer taken corresponding to the intensity of magnetism at said mean position. By making a sequence of such observations, a type of well-log similar to that described above may be obtained. In lieu of keeping a constant speed, it would be satisfactory to observe the speed as given by the tachometer, record the speed, and thereafter make appropriate computations for compensating for the variation in speed. Furthermore, a governor 42 on the guide shaft 33 may be provided to control the gain of the amplifier.

By comparing records from a number of adjacent bore holes, correlation of stratigraphic horizons may be obtained. For it is clear that the contrast of the remanence of strata will be characteristic and remain uniform throughout large areas.

Instead of using the magnetizer of Fig. 4 in the manner set forth, the device of Fig. 6 may be used. In this case a constant current flowing through the solenoids will cause a high concentration of flux in washer 19b and low flux elsewhere. In traversing the bore hole, the wall materials will not react readily to the weak fields of magnetic washers 19a and 19c, but will respond readily to the dense flux of washer 19b. Hence by lowering it into the bore hole, the wall materials will be magnetized and some magnetism will remain even after a section of bore hole has been traversed by this magnetizer.

What is claimed is:

1. The method of bore hole logging which includes the steps of magnetically developing latent magnetic characteristics of strata traversed by the bore hole and thereafter obtaining indications of magnetic characteristics of the strata which remain temporarily after the development thereof.

2. The method of bore hole logging which includes the steps of polarizing magnetically the material in the walls of the bore hole and subsequently measuring the residual magnetism.

3. The method of bore hole logging which comprises the steps of traversing a section of bore hole with a magnetizer, subsequently traversing the same section of the bore hole with a pick-up and obtaining indications of the response of said pick-up.

4. The method of bore hole logging which comprises the steps of traversing a section of bore hole with a magnetizer and varying the magnetizing current and subsequently traversing the same section of bore hole with a pick-up.

5. The method of bore hole logging comprising the steps of traversing a section of bore hole with a magnetizer and varying the magnetizing current synchronously with the displacement of the magnetizer and subsequently traversing the same section of bore hole with a pick-up.

6. The method of bore hole logging which comprises the steps of traversing a section of bore hole with a magnetizer and intermittently varying the magnetizing current and subsequently traversing the same section of bore hole with a pick-up.

7. The method of bore hole logging which comprises the steps of traversing a bore hole with a magnetizer, simultaneously varying the magnetizing current and subsequently traversing the same section of bore hole with a pick-up and recording a measure of the magnetic properties of the materials in the walls of the bore hole.

8. The method of bore hole logging which comprises the steps of traversing a section of bore hole with a magnetizer, intermittently varying the magnetizing current and subsequently traversing the same section of bore hole with a pick-up and recording a measure of the magnetic properties of the material in the walls of the bore hole.

9. In apparatus for logging the characteristics of materials in the wall of a well bore, a magnetic member adapted for insertion in the bore, means to cause said member to traverse the bore, a source of current and an indicator, means for optionally connecting the source of current, or the indicator, to the magnetic member, and means, effective when the member is connected to the source of current for periodically breaking the connection in accordance with the movement of the member in the well.

10. In apparatus for logging the characteristics of materials in the wall of a well bore: magnetically responsive means arranged to traverse the bore, indicating means operated by the magnetically responsive means, amplifying means interposed between the indicating means and said magnetically responsive means, and means responsive to the speed of traverse of the magnetically responsive means for controlling the gain of the amplifier.

11. In apparatus of the character described, a magnetic member adapted to be inserted in and traverse a well bore, comprising: a core, a ring of magnetic material carried by the core and arranged to coact with the magnetic material in the wall of the bore, and a winding carried by the core.

12. In apparatus of the character described, a magnetic member adapted to be inserted in and traverse a well bore, comprising: a core, a ring of magnetic material carried by the core and arranged to coact with the magnetic material in the wall of the bore, and a winding carried by the core to magnetize the ring, the exterior surface of the ring being of reduced width so as to increase the density of the magnetic flux on the outside of the ring.

13. In apparatus of the character described, a magnetic member adapted to be inserted in and traverse a well bore, comprising: a core, a plurality of rings of magnetic material substantially uniformly axially spaced along the core, and differentially connected windings between adjacent rings.

14. In apparatus of the character described, a magnetic member adapted to be inserted in and traverse a well bore, comprising: a core, a ring of magnetic material carried by the core and arranged to coact with the magnetic material in the wall of the bore, a winding carried by the core to magnetize the ring, means for causing the member to traverse the well bore, and means for supplying pulsating current to the winding, the rate of the pulsations depending on the rate of traverse of the member.

15. In apparatus of the character described, a magnetic member adapted to be inserted in and traverse a well bore, comprising: a core, a ring of magnetic material carried by the core and arranged to coact with the magnetic material in the wall of the bore, a winding carried by the core to magnetize the ring, means for causing the member to traverse the well bore, a source of current, means connecting the source of current with the winding, and means for periodically interrupting said connection at a rate depending on the rate of traverse of the member.

16. In apparatus of the character described, a magnetic member adapted to be inserted in and traverse a well bore, comprising: a core, a plurality of rings of magnetic material substantially uniformly axially spaced along the core, and magnetizing windings between adjacent rings, said windings being so arranged that adjacent rings are of opposite polarity, means for intermittently connecting the windings with the source of current, the interval between successive connections being so proportioned with respect to the rate of traverse of the member and the space between rings of corresponding polarity that the windings are connected whenever the member has moved a distance equal to said space.

17. A bore hole magnetizer comprising three magnetically permeable washers equally spaced on a magnetically permeable core wound and energized to create the same magnetic polarity on the outside washers and the opposite polarity on the center washer.

18. Apparatus for magnetizing the walls of the bore hole comprising an electrically energized magnetizer, means for translating said magnetizer through said bore hole, and means for energizing and de-energizing said magnetizer at known spaced intervals.

BERNARD F. McNAMEE.
FRANK RIEBER.